(12) United States Patent
Clayton

(10) Patent No.: US 9,803,598 B2
(45) Date of Patent: Oct. 31, 2017

(54) AIR INTAKE SYSTEM FOR ENGINE

(71) Applicant: Caterpillar Inc., Peoria, IL (US)

(72) Inventor: Robert D. Clayton, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 139 days.

(21) Appl. No.: 14/976,771

(22) Filed: Dec. 21, 2015

(65) Prior Publication Data

US 2017/0175689 A1   Jun. 22, 2017

(51) Int. Cl.
*F02M 35/08* (2006.01)
*B01D 53/26* (2006.01)
*F02M 35/10* (2006.01)
*F02M 35/02* (2006.01)

(52) U.S. Cl.
CPC .. *F02M 35/10288* (2013.01); *F02M 35/0215* (2013.01); *F02M 35/0218* (2013.01); *F02M 35/10157* (2013.01); *F02M 35/10255* (2013.01); *F02M 35/10268* (2013.01)

(58) Field of Classification Search
CPC .......... F02D 41/029; F02D 2200/0812; F02D 2200/0806; F01N 13/1822; F01N 3/0231; F01N 3/108; F01N 3/021; F01N 3/2066; F01N 3/035; F01N 3/106; F01N 9/002; F01N 2590/08; F01N 2610/02; F01N 2250/02; F01N 3/023; F01N 13/009; F01N 13/0097; Y02T 10/26; Y02T 10/166; Y02T 10/20; F02M 35/10222; F02M 35/104; F02M 35/02; F02M 35/10; B01D 2279/30; B01D 46/0027; B01D 53/9495; B01D 46/006

See application file for complete search history.

(56) References Cited

U.S. PATENT DOCUMENTS

| | | | |
|---|---|---|---|
| 2,733,697 A | | 2/1956 | Downs, Jr. |
| 3,757,521 A | * | 9/1973 | Tourtellotte ........... B01D 53/86 422/171 |
| 6,352,068 B1 | * | 3/2002 | Jacobsen ................... F01N 1/14 123/585 |
| 6,352,578 B1 | | 3/2002 | Sakata et al. |
| 6,365,108 B1 | * | 4/2002 | Philyaw ............... B01D 46/106 422/98 |
| 6,432,177 B1 | | 8/2002 | Dallas et al. |
| 6,712,885 B1 | | 3/2004 | Basseen et al. |

(Continued)

FOREIGN PATENT DOCUMENTS

| | | |
|---|---|---|
| DE | 19538605 | 4/1997 |
| DE | 19920258 A1 | 11/2000 |

(Continued)

*Primary Examiner* — Marguerite McMahon
*Assistant Examiner* — Tea Holbrook

(57) ABSTRACT

An air intake system for an engine is provided. The air intake system includes a first air intake conduit, a second air intake conduit, an exhaust conduit, and a valve. The first air intake provides air to the engine and includes a siloxane adsorber. The second air intake conduit provides air to the engine during regeneration of the siloxane adsorber. The siloxane adsorber is heated during regeneration. The exhaust conduit is selectively connected to the first air intake conduit downstream of the siloxane adsorber. The valve is configured to connect the first intake conduit to the exhaust conduit during regeneration of the siloxane adsorber.

20 Claims, 5 Drawing Sheets

(56) References Cited

U.S. PATENT DOCUMENTS

| | | | |
|---|---|---|---|
| 6,722,352 B2 * | 4/2004 | Smolarek | F01N 3/0807 123/26 |
| 6,783,881 B2 | 8/2004 | Stenersen et al. | |
| 6,855,743 B1 * | 2/2005 | Gvozdic | C08J 3/075 264/41 |
| 6,951,697 B2 | 10/2005 | Stenersen | |
| 6,997,977 B2 | 2/2006 | Dallas et al. | |
| 7,128,064 B2 * | 10/2006 | Heider | F02M 25/12 123/585 |
| 7,264,648 B1 | 9/2007 | Wetzel et al. | |
| 7,306,652 B2 | 12/2007 | Higgins | |
| 7,393,381 B2 * | 7/2008 | Tower | B01D 53/02 95/11 |
| 7,524,344 B2 | 4/2009 | Gittleman et al. | |
| 7,753,034 B2 | 7/2010 | Hoke et al. | |
| 7,976,619 B2 | 7/2011 | Huff | |
| 8,435,329 B2 | 5/2013 | Hayward | |
| 8,925,497 B2 * | 1/2015 | Besmann | F23G 7/065 123/1 A |
| 9,023,755 B2 | 5/2015 | Herrera et al. | |
| 9,039,807 B2 | 5/2015 | Mitariten et al. | |
| 9,605,626 B2 * | 3/2017 | Harris | F02M 35/0218 |
| 2002/0059920 A1 * | 5/2002 | Yoshioka | F02M 35/04 123/518 |
| 2004/0050373 A1 * | 3/2004 | Gao | F02M 26/35 123/568.12 |
| 2006/0042209 A1 * | 3/2006 | Dallas | B01D 39/1623 55/524 |
| 2007/0068386 A1 * | 3/2007 | Mitariten | B01D 53/04 95/116 |
| 2008/0179177 A1 * | 7/2008 | Cha | B01D 53/44 204/157.43 |
| 2010/0307335 A1 * | 12/2010 | Hayward | B01D 53/02 95/95 |
| 2012/0199083 A1 * | 8/2012 | Besmann | F02M 21/0209 123/3 |
| 2014/0366726 A1 * | 12/2014 | Mitariten | B01D 53/0462 95/141 |
| 2015/0023844 A1 | 1/2015 | Clayton, Jr. | |
| 2015/0118137 A1 | 4/2015 | Hoang et al. | |
| 2015/0285112 A1 * | 10/2015 | Mathiasson | B01D 46/0019 60/311 |
| 2016/0194991 A1 * | 7/2016 | Clayton, Jr. | F01N 3/0224 422/169 |
| 2016/0258392 A1 * | 9/2016 | Harris | B01D 53/04 |

FOREIGN PATENT DOCUMENTS

| | | |
|---|---|---|
| DE | 29824595 U1 | 10/2001 |
| DE | 10224349 A1 | 1/2004 |
| DE | 102004005626 A1 | 1/2006 |
| DE | 102004051807 B4 | 10/2008 |
| EP | 955352 A1 | 11/1999 |
| EP | 0818617 B1 | 10/2002 |
| EP | 1316350 A1 | 6/2003 |
| EP | 1561506 B1 | 5/2007 |
| FR | 2854819 | 11/2004 |
| GB | 2396315 A | 6/2004 |
| GB | 2440123 | 1/2008 |
| WO | 2007005939 A3 | 1/2007 |
| WO | 2007019535 | 2/2007 |
| WO | 2007038226 A1 | 4/2007 |
| WO | 2008024329 | 2/2008 |
| WO | 2008040038 A1 | 4/2008 |
| WO | 2008089147 | 7/2008 |

* cited by examiner

AIR INTAKE SYSTEM FOR ENGINE

TECHNICAL FIELD

The present disclosure relates to an air intake system for an engine. In particular, the present disclosure relates to an air intake system having a siloxane adsorber for removing siloxane from intake air supplied to the engine.

BACKGROUND

Landfill operations are a major part of waste management. During landfill operations, waste may be delivered to landfill sites via waste collection vehicles. After the waste is unloaded on a surface area of the landfill site or waste transfer site, machines, such as compactors or bulldozers, may be used to spread compact, and transfer the waste. The waste may include certain domestic products that may be composed of siloxanes. The siloxanes are non-toxic silicon-bearing organic compounds that may be added to many domestic products. Due to the widespread use of the domestic products, siloxane concentration may gradually increase in the landfill sites. Large molecular weight siloxanes may decompose to smaller more volatile siloxane compounds that evaporate and diffuse into the ambient air. The machines that operate in the landfill sites may be exposed to the siloxanes in the ambient air.

The siloxanes may be introduced into an engine of the machine via the air intake and may combust to form silica. The silica may adhere to surfaces inside the engine and an exhaust aftertreatment system of the engine. The exhaust aftertreatment components may get plugged causing the restriction of the exhaust flow, which increases the backpressure. The increased back pressure reduces the engine efficiency and may increase the DPF regeneration frequency for active systems. Additionally, sensors can be coated or plugged, causing inaccurate readings or delayed response. Therefore, high concentrations of siloxanes in the ambient air may severely affect the maintenance intervals of the engine or machine causing more downtime and more parts to replace.

U.S. Pat. No. 6,997,997 discloses an adsorptive duct for an engine. The adsorptive duct includes an adsorptive region for adsorbing the containment including siloxane from intake air delivered to the engine. However, the adsorptive region may be completely filled with contaminants after extended operation of the engine. This may cause the siloxane to enter in cylinders of the engine. Also, replacement of the adsorptive duct after extended operation of the engine may be costly.

SUMMARY OF THE INVENTION

According to an aspect, an air intake system for an engine is disclosed. The air intake system includes a first air intake conduit having a siloxane adsorber for providing air to the engine. The air intake system also includes a second air intake conduit for providing air to the engine during regeneration of the siloxane adsorber. The siloxane adsorber is heated during regeneration. Further, the air intake system includes an exhaust conduit selectively connecting to the first air intake conduit downstream of the siloxane adsorber. Furthermore, a valve is configured to connect the first air intake conduit to the exhaust conduit during regeneration of the siloxane adsorber.

According to another aspect, an engine is disclosed. The engine includes at least one combustion cylinder and first air intake conduit. The first air intake conduit includes a siloxane adsorber for providing air to the combustion cylinder. The engine also includes a second air intake conduit for providing air to the combustion cylinder during regeneration of the siloxane adsorber. The siloxane adsorber is heated during regeneration. Further, the engine includes an exhaust conduit selectively connecting to the first air intake conduit downstream of the siloxane adsorber. Furthermore, a valve is configured to connect the first air intake conduit to the exhaust conduit during regeneration of the siloxane adsorber.

DETAILED DESCRIPTION

Figure 1:
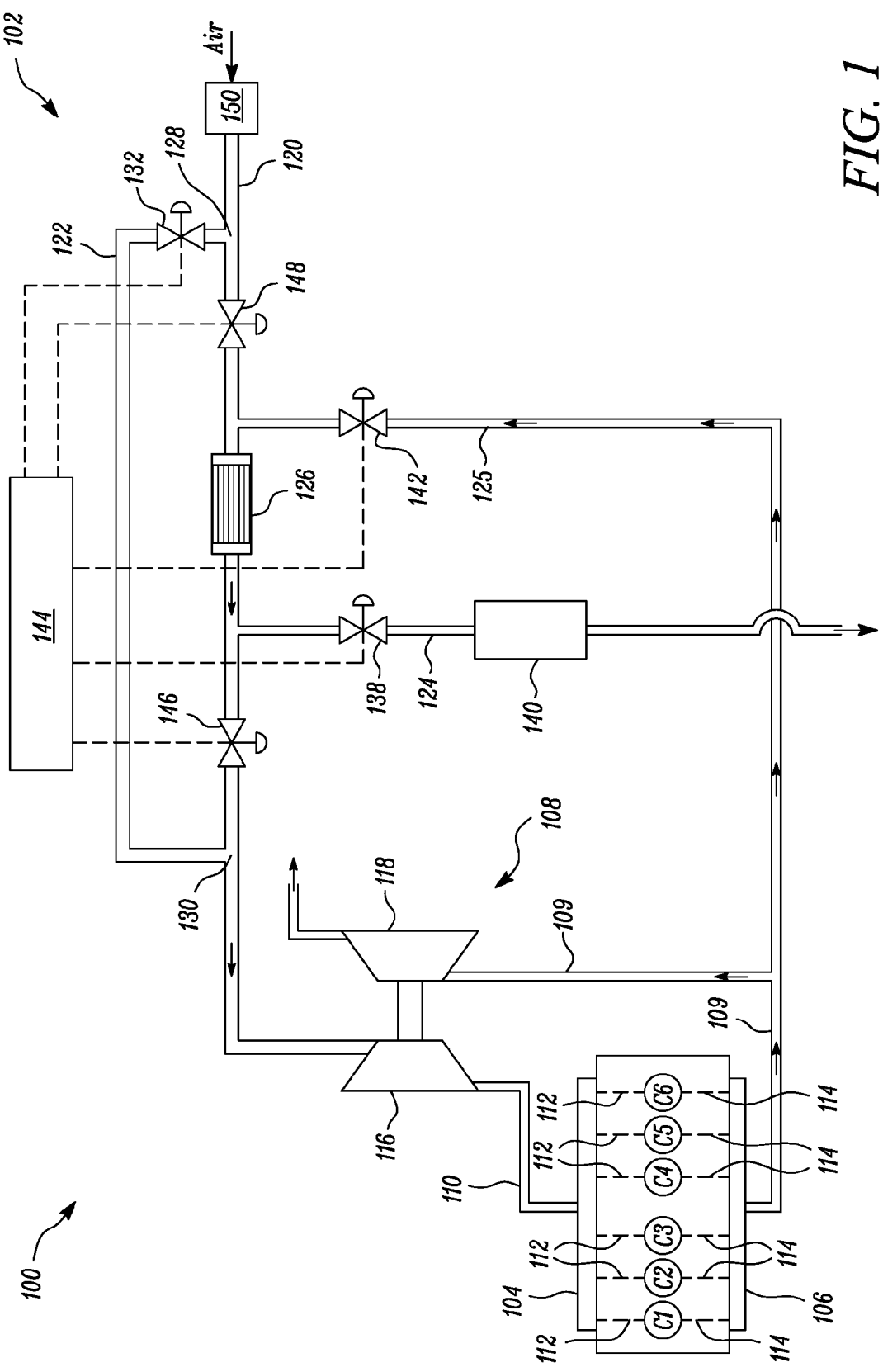
FIG. 1 illustrates an engine including an embodiment of an air intake system in accordance with an embodiment.

Referring to FIG. 1, there is shown an embodiment of an engine 100 including an air intake system 102. The engine 100 may be a gasoline engine, a gaseous engine, a diesel engine (shown in FIG. 1), or a dual fuel engine. The gaseous engine or dual fuel engine may use natural gas, propane gas, methane gas or any other gaseous fuel suitable for use in the gaseous engine. The engine 100 may be a single cylinder or a multi cylinder engine.

As shown in FIG. 1, the engine 100 may also include an intake manifold 104, an exhaust manifold 106, and a turbocharger 108. The intake manifold 104 and the exhaust manifold 106 are each fluidly coupled with a plurality of combustion cylinders C1 through C6, as indicated schematically by dashed lines 112 and 114, respectively. In the embodiment shown, a single intake manifold 104 and exhaust manifold 106 are fluidly coupled with combustion cylinders C1 through C6. However, it is also possible to configure the intake manifold 104 and/or the exhaust manifold 106 as a split or multiple-piece manifold, each associated with a different group of combustion cylinders.

The intake manifold 104 receives air from the air intake system 102 via the turbocharger 108. The turbocharger 108 includes a compressor 116 and a turbine 118. The compressor 116 is driven by the turbine 118 and provides compressed air to a supply conduit 110. The turbine 118 is driven by exhaust gases discharged from combustion cylinders C1 to C6. In another embodiment, the intake manifold 104 may receive air from the air intake system 102 via a supercharger. The supercharger is a compressor driven by the engine 100.

Referring to FIG. 1, the air intake system 102 includes a first air intake conduit 120, a second air intake conduit 122, an exhaust conduit 124, and a regeneration conduit 125. The first air intake conduit 120 is configured to provide air to the combustion cylinders C1 to C6 of the engine 100 via the compressor 116 and the intake manifold 104. The first air intake conduit 120 includes a siloxane adsorber 126. The siloxane adsorber 126 is positioned upstream of the compressor 116 and inside the first air intake conduit 120. The siloxane adsorber 126 is configured to adsorb siloxane molecules present in the air to be delivered to the combustion cylinders C1 to C6. Further, the first air intake conduit 120 may include a first entry valve 148 and a first exit valve 146 positioned upstream and downstream of the siloxane adsorber 126 respectively. The first entry valve 148 and the first exit valve 146 may be configured to control the passage of air and/or the gas though the first air intake conduit 120.

The second air intake conduit 122 is a bypass conduit and configured to provide air to the combustion cylinders C1 to C6 of the engine 100. The second air intake conduit 122 is configured to provide air to the combustion cylinders C1 to C6 during regeneration of the siloxane adsorber 126. Inlet 128 of the second air intake conduit 122 is selectively coupled to the first air intake conduit 120 at a location upstream of the siloxane adsorber 126. Outlet 130 of the second air intake conduit 122 is selectively coupled to the first air intake conduit 120 at a location downstream of the siloxane adsorber 126. Further, the second air intake may include a second entry valve 132. The second entry valve 132 may be opened for allowing passage of air through the second air intake conduit 122 thereby fluidly coupling the inlet 128 and the outlet 130 to the first air intake conduit 120 upstream and downstream of the siloxane adsorber 126, respectively.

Further, the exhaust conduit 124 is in fluid communication with the first air intake conduit 120 and selectively coupled to the first air intake conduit 120 downstream of the siloxane adsorber 126. The exhaust conduit 124 may include a valve 138. The valve 138 is configured to selectively couple the first air intake conduit 120 to the exhaust conduit 124 during regeneration of the siloxane adsorber 126. The opening of the valve 138 allows passage of gas existing from the siloxane adsorber 126 to the exhaust conduit 124 during regeneration of the siloxane adsorber 126.

The exhaust conduit 124 may also include a condenser 140 disposed downstream of the valve 138. The condenser 140 is configured to condense and store siloxane desorbed from the siloxane adsorber 126 during regeneration. In an alternate embodiment, the exhaust conduit 124 may include a burner for converting the siloxane present in the gas leaving the siloxane adsorber 126 during regeneration into silicone dioxide. In yet another embodiment, the gas leaving the siloxane adsorber 126 during regeneration may be discharged into the atmosphere via the exhaust conduit 124. The discharge of the gas from the exhaust conduit 124 is performed in such a manner that the siloxane rich gas does not re-enter the air intake system 102 prior to being diluted.

The regeneration of the siloxane adsorber 126 is performed to remove the siloxane accumulated on the siloxane adsorber 126. The regeneration refers to heating the siloxane adsorber 126 and removing the siloxanes by using a fluid. In the illustrated embodiment, the regeneration of the siloxane adsorber 126 is performed using an exhaust gas discharged from the combustion cylinders C1 to C6.

As shown in FIG. 1, the exhaust gas is delivered to the first air intake conduit 120 and thereby to the siloxane adsorber 126 through the regeneration conduit 125. An end of the regeneration conduit 125 may be coupled with a discharge conduit 109 upstream of the turbine 118 and another end of the regeneration conduit 125 may couple to the first air intake conduit 120. Thereby, the regeneration conduit 125 provides pre-turbo exhaust to the siloxane adsorber 126 for regeneration. In an embodiment, the regeneration conduit 125 is coupled to the first air intake conduit 120 at a location downstream of the first entry valve 148. The regeneration conduit 125 may include a regeneration valve 142 to selectively couple the regeneration conduit 125 to the first air intake conduit 120. The opening of the regeneration valve 142 may allow flow of exhaust gas from the discharge conduit 109 to the first air intake conduit 120 though the regeneration conduit 125.

The opening and closing of the first entry valve 148, the second entry valve 132, the valve 138, the regeneration valve 142, and the first exit valve 146 may be controlled by a controller 144. Various valves 132, 138, 142, 146, and 148 may be solenoid actuated valves to selectively introduce and also control the amount of air or gas. Although solenoid actuated valves are contemplated, other types of valves such as but not limited to hydraulically actuated valves, pneumatically actuated valves, check valves and the like known to one skilled in the art would also apply.

In an embodiment, the controller 144 may be an electronic control module (ECM) associated with the engine 100. The controller 144 may include a non-transient computer readable storage media (not shown) including code for enabling monitoring and control of the engine 100. The controller 144 may be configured to receive signals from a variety of engine sensors, as further elaborated herein, in order to determine operating parameters and operating conditions, and correspondingly adjust various engine actuators to control operation of the engine 100. For example, the controller 144 may receive signals from various engine sensors including, but not limited to, engine speed, engine load, intake manifold air pressure, siloxane sensor, exhaust pressure, ambient pressure, exhaust temperature, etc. . . . . Further, the controller 144 may receive signal from a user interface (not shown). An operator may input parameters corresponding to desired operation of the engine 100 e.g. initiation of the regeneration of the siloxane adsorber 126. Correspondingly, the controller 144 may send signals to the first entry valve 148, the second entry valve 132, the valve 138, the regeneration valve 142, and the first exit valve 146 to control the flow of air and/or gas from the first air intake conduit 120, the second air intake conduit 122, the exhaust conduit 124, and the regeneration conduit 125.

The controller 144 may initiate the regeneration of the siloxane adsorber 126 by introducing an exhaust gas discharged from the exhaust manifold 106. In an embodiment, the controller 144 may initiate the regeneration of the siloxane adsorber 126 after certain duration of operation of the engine 100. The duration of operation of the engine 100 may be determined based on amount of siloxanes measured in ambient air and siloxane adsorbing capacity of the siloxane adsorber 126. The amount of siloxane present in the ambient air may be measured by a sensor suitable for monitoring the siloxane content in the atmospheric air. The sensor may be positioned at any suitable location on the machine, engine, intake conduit, or at air filter for the engine 100.

In another embodiment, the controller 144 may initiate regeneration of the siloxane adsorber 126 based on the amount of siloxane present in air flowing through the first air intake conduit 120 downstream of the siloxane adsorber 126. A suitable sensor to measure the siloxane content in the intake air may be positioned in the first air intake conduit 120 downstream of the siloxane adsorber 126. The controller may initiate the regeneration of the siloxane adsorber 126 when the amount of siloxane in the intake air flowing downstream of the siloxane adsorber 126 is above a threshold value.

During regeneration of the siloxane adsorber 126, the controller 144 allows the intake air to flow through the second air intake conduit 122 and prevent the flow of intake air through the first air intake conduit 120. The controller 144 allows the intake air though the second air intake conduit 122 by opening the second entry valve 132 and closing the first entry valve 148 to prevent the flow of intake air though the first air intake conduit 120. The first entry valve 148 may be disposed in the first air intake conduit 120 at a location downstream of the connection of the second air intake conduit 122 and upstream of the connection of the regeneration conduit 125 to the first air intake conduit 120.

Further, the controller 144 may actuate and close the first exit valve 146 to prevent flow of gases exiting the siloxane adsorber 126 to the combustion cylinders C1 to C6 during regeneration of the siloxane adsorber 126. Also, during regeneration, the controller 144 may actuate and open the valve 138 allow the gas exiting the siloxane adsorber 126 to flow through the exhaust conduit 124. Thereby by controlling the opening and closing of the first exit valve 146 and the valve 138, the controller 144 prevents the flow of siloxane or silica compound containing gases to the combustion cylinders C1 to C6.

Figure 2:
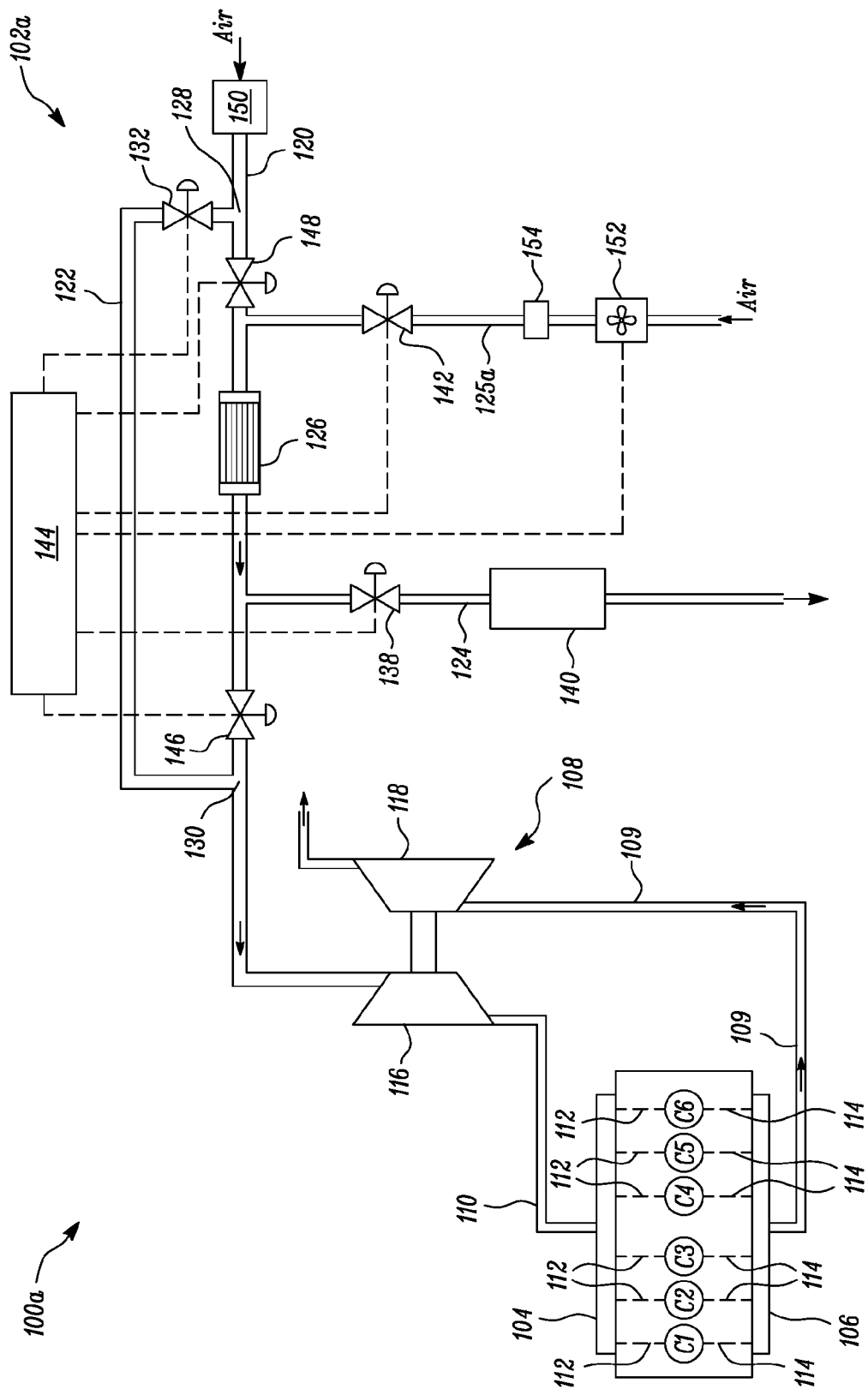
FIG. 2 illustrates an engine including an alternative air intake system in accordance with an embodiment.

Referring to FIG. 2, there is shown an engine 100a having an air intake system 102a according to an alternative embodiment. The air intake system 102a includes the first air intake conduit 120, the second air intake conduit 122, the exhaust conduit 124, and a regeneration conduit 125a.

The regeneration conduit 125a may be configured to provide air to the siloxane adsorber 126 for regenerating the siloxane adsorber 126. The regeneration conduit 125a may be selectively coupled to the first air intake conduit 120 at a location downstream of the first entry valve 148 and upstream of the siloxane adsorber 126. The regeneration conduit 125a may be fluidly coupled to the first air intake conduit 120 when the regeneration valve 142 is opened, thereby allowing passage of air from the regeneration conduit 125a to the first air intake conduit 120. The opening of the regeneration valve 142 may be controlled by a controller 144a.

The controller 144a may initiate and control the regeneration of the siloxane adsorber 126 as described earlier in FIG. 1. In the illustrated embodiment, the regeneration of the siloxane adsorber 126 is performed by using air. Also, the controller 144a may control opening and closing of various valves such as the second entry valve 132, the valve 138, the regeneration valve 142, the first entry valve 148, and the first exit valve 146 in a similar manner as described earlier in reference to FIG. 1 for providing intake air to the combustion cylinders C1 to C6 and regeneration of the siloxane adsorber 126.

The regeneration conduit 125a may also include a fan 152 and a heating module 154. As shown in FIG. 2, the fan 152 may be disposed upstream of the regeneration valve 142. The fan 152 is configured to force air from atmosphere to the first air intake conduit 120 through the regeneration conduit 125a during regeneration of the siloxane adsorber 126. Initiation and speed of the fan 152 may be controlled by the controller 144a. The controller 144a may initiate or start the fan 152 upon initiation of the regeneration of the siloxane adsorber 126. In another embodiment, an end of the regeneration conduit 125a may be coupled to the outlet of the compressor 116 and upstream of a heat exchanger (not shown) to provide compressed air to the siloxane adsorber 126 during regeneration. Further, the air delivered to the siloxane adsorber 126, during regeneration, may be heated by the heating module 154.

As shown in FIG. 2, the heating module 154 is disposed in the regeneration conduit 125a between the fan 152 and the regeneration valve 142. In an embodiment, the heating module 154 may be disposed in the regeneration conduit 125a upstream of the fan 152. In another embodiment, the heating module 154 may be disposed downstream of the regeneration valve 142. In yet another embodiment, the heating module 154 may be disposed in the first air intake conduit 120 and upstream of the siloxane adsorber 126 to heat the air for performing the regeneration. In another embodiment, the heating module 154 may be positioned in relation to the first air intake conduit 120 such that the heating module 154 heats the siloxane adsorber 126 directly. The heating module 154 may increase the temperature of air or the siloxane adsorber 126 suitable for performing regeneration. The heating module 154 may be an electric heater. Although use of electric heater as the heating module 154 is contemplated, any other type of heating module such as a gas heater, or any other type of heater known in the art would also apply. In an embodiment, the heating module 154 may include a fuel injector to inject fuel which is burned in the presence of air to suitably increase the temperature of air flowing through the siloxane adsorber 126 during regeneration of the siloxane adsorber 126.

Figure 3:
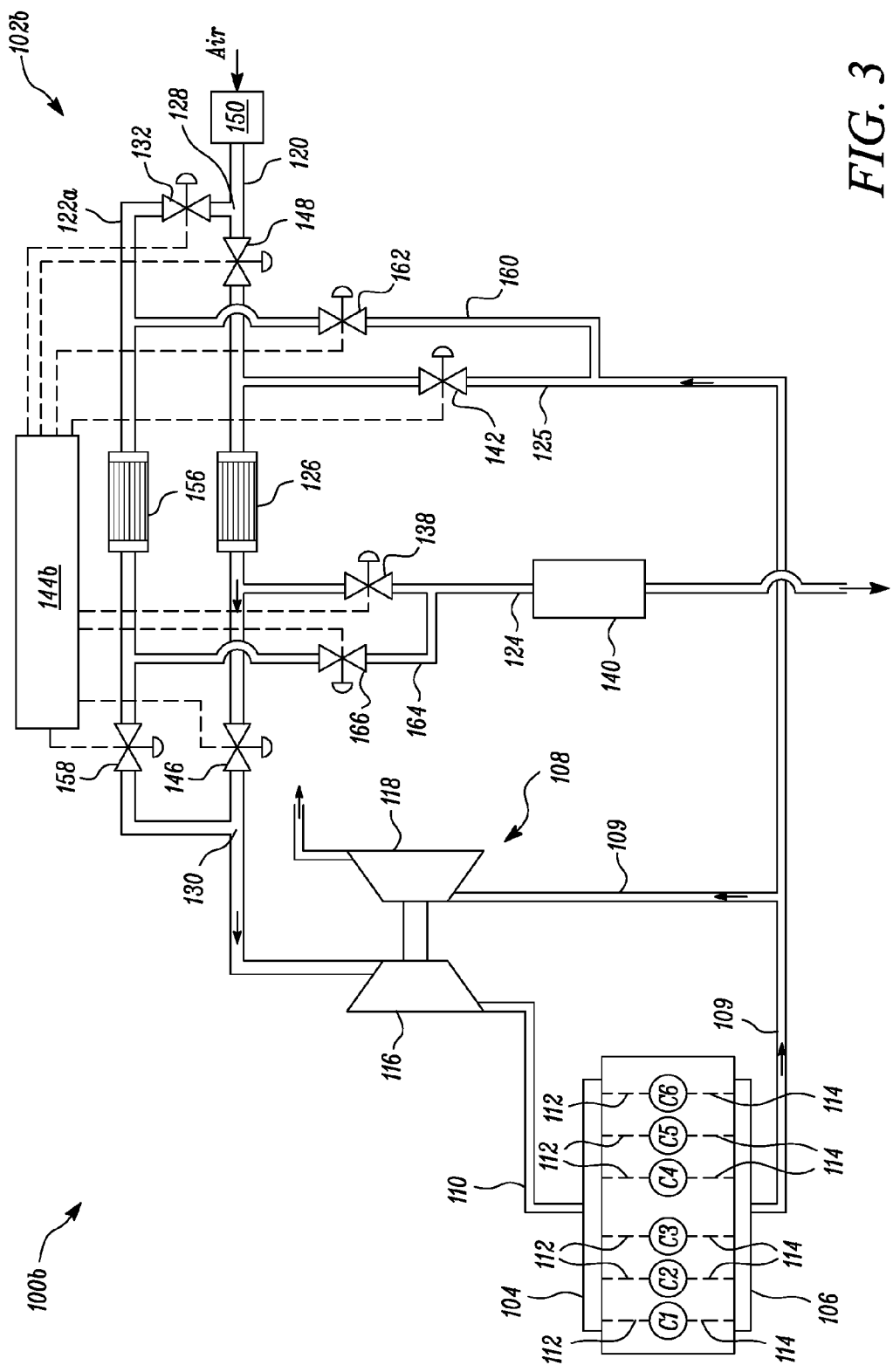
FIG. 3 illustrates an engine including an alternative air intake system in accordance with an embodiment.

Referring to FIG. 3, there is shown an engine 100b having an air intake system 102b according to an embodiment. The air intake system 102b may include the first air intake conduit 120, the second air intake conduit 122a, the exhaust conduit 124, a second exhaust conduit 164, the regeneration conduit 125, and a second regeneration conduit 160. The second air intake conduit 122a may include a second siloxane adsorber 156, the second entry valve 132, and a second exit valve 158.

The second siloxane adsorber 156 may be disposed of in the second air intake conduit 122a and positioned between the second entry valve 132 and the second exit valve 158. During regeneration of the siloxane adsorber 126 the intake air delivered to the combustion cylinders C1 to C6 flow through the second air intake conduit 122a, which is filtered by the second siloxane adsorber 156. Thereby, the combustion cylinders C1 to C6 receives filtered intake air during regeneration of the siloxane adsorber 126. During regeneration of the siloxane adsorber 126, the second entry valve 132 and the second exit valve 158 are opened, allowing flow of intake air through the second air intake conduit 122a to combustion cylinders C1 to C6.

Further, the second regeneration conduit 160 may be fluidly coupled to the second air intake conduit 122a. The second regeneration conduit 160 may be coupled to the second air intake conduit 122a between the second entry valve 132 and the second siloxane adsorber 156. Another end of the second regeneration conduit 160 may be coupled to the regeneration conduit 125 at location upstream of the regeneration valve 142.

The second regeneration conduit 160 may include a second regeneration valve 162 to selectively control passage of a fluid through the second regeneration conduit 160 to the second air intake conduit 122a. In the present embodiment, opening and closing of the second regeneration valve 162 may control flow of exhaust gas discharged from the combustion cylinders C1 to C6 to the second air intake conduit 122a. Exhaust gases may enter the second regeneration conduit 160 when the second regeneration valve 162 is opened for performing the regeneration of the second siloxane adsorber 156.

Again, referring to FIG. 3, the second air intake conduit 122a may be selectively coupled to the second exhaust conduit 164. The second exhaust conduit 164 may be fluidly coupled to the second air intake conduit 122a between the second siloxane adsorber 156 and the second exit valve 158. Another end of the second exhaust conduit 164 may be coupled to the exhaust conduit 124 between the valve 138 and the condenser 140. The second exhaust conduit 164 may include a second valve 166. The second valve 166 may selectively control passage of fluid from the second air intake conduit 122a to the condenser 140 or atmosphere via the second exhaust conduit 164. Opening of the second valve 166 may allow passage of the gas exiting the second siloxane adsorber 156, during regeneration, to the second exhaust conduit 164 and to the condenser 140 disposed in the exhaust conduit 124 or directly to the atmosphere. In an embodiment, a burner may be used instead of the condenser 140 which may burn the gas and thereby converting siloxane into silica compounds before discharging to atmosphere.

The regeneration of the siloxane adsorber 126 and the second siloxane adsorber 156 may be initiated and controlled by the controller 144b. In the present embodiment, as shown in FIG. 3, the regeneration of the siloxane adsorber 126 and the second siloxane adsorber 156 may be performed by using exhaust gases discharged from the combustion cylinders C1 to C6. The controller 144b may initiate the regeneration of the second siloxane adsorber 156 similar to the initiation of regeneration of the siloxane adsorber 126 as described earlier with reference to FIG. 1. In an embodiment, the controller 144b may initiate the regeneration of the second siloxane adsorber 156 when the siloxane adsorber 126 is working in good condition and the siloxane content adsorbed on the second siloxane adsorber 156 may be less than threshold value. This may ensure that the second siloxane adsorber 156 is in good operating condition when the regeneration of the siloxane adsorber 126 is being performed.

The controller 144b may be in communication with and control opening and closing of the second entry valve 132, the valve 138, the regeneration valve 142, the first entry valve 148, the first exit valve 146, the second exit valve 158, the second regeneration valve 162, and the second valve 166 for performing regeneration of the siloxane adsorber 126 and the second siloxane adsorber 156 and allowing the passage of air to the combustion cylinders C1 to C6 via first air intake conduit 120 and the second air intake conduit 122a.

For performing and during regeneration of the second siloxane adsorber 156, the controller 144b may close the second entry valve 132 and the second exit valve 158. The closing of the second entry valve 132 and the second exit valve 158 prevents the flow of intake air to the combustion cylinders C1 to C6 via the second air intake conduit 122a. Also, the controller 144b may open and control the second regeneration valve 162 to provide exhaust gases to the second siloxane adsorber 156. When the exhaust gases passes through the second siloxane adsorber 156, the exhaust gas may heat the second siloxane adsorber 156 and thereby removes the siloxanes adsorbed by the second siloxane adsorber 156.

Further, the controller 144b may close the second exit valve 158 and open the second valve 166 during regeneration of the second siloxane adsorber 156. The closing of the second exit valve 158 may prevent the flow of siloxane containing gases exiting the second siloxane adsorber 156 to the compressor 116 and the combustion cylinders C1 to C6. As shown in FIG. 3, the opening of the second valve 166 may allow passage of the siloxane containing gases exiting the second siloxane adsorber 156 to the condenser 140. The condenser 140 may condense and store the siloxane desorbed from the second siloxane adsorber 156 which may be disposed of later on. In another embodiment, a burner may be used in place of or in addition to the condenser 140 to convert the siloxanes into silica compounds. Generated silica compound may be discharged to the atmosphere through the exhaust conduit 124.

Again referring to FIG. 3, during regeneration of the second siloxane adsorber 156, the intake air to combustion cylinders C1 to C6 is provided by filtering the intake air by the siloxane adsorber 126. To achieve passage of intake air through the siloxane adsorber 126, the controller 144b may open the first entry valve 148 and the first exit valve 146 and may close the valve 138 and the regeneration valve 142.

Also, the controller 144b may control various valves 132, 138, 142, 146, and 148 in a similar manner as describes with respect to FIG. 1 for initiating and during regeneration of the siloxane adsorber 126. During regeneration of the siloxane adsorber 126, the controller 144b may open the second entry valve 132 and the second exit valve 158 and may close the second regeneration valve 162 and the second valve 166 to provide intake air to compressor 116 and the combustion cylinders though the second air intake conduit 122a. Further, the controller 144b controls the various valves in a similar manner as described in FIG. 1 such that the gas exiting the siloxane adsorber 126 is prevented to enter the combustion cylinders C1 to C6.

Figure 4:
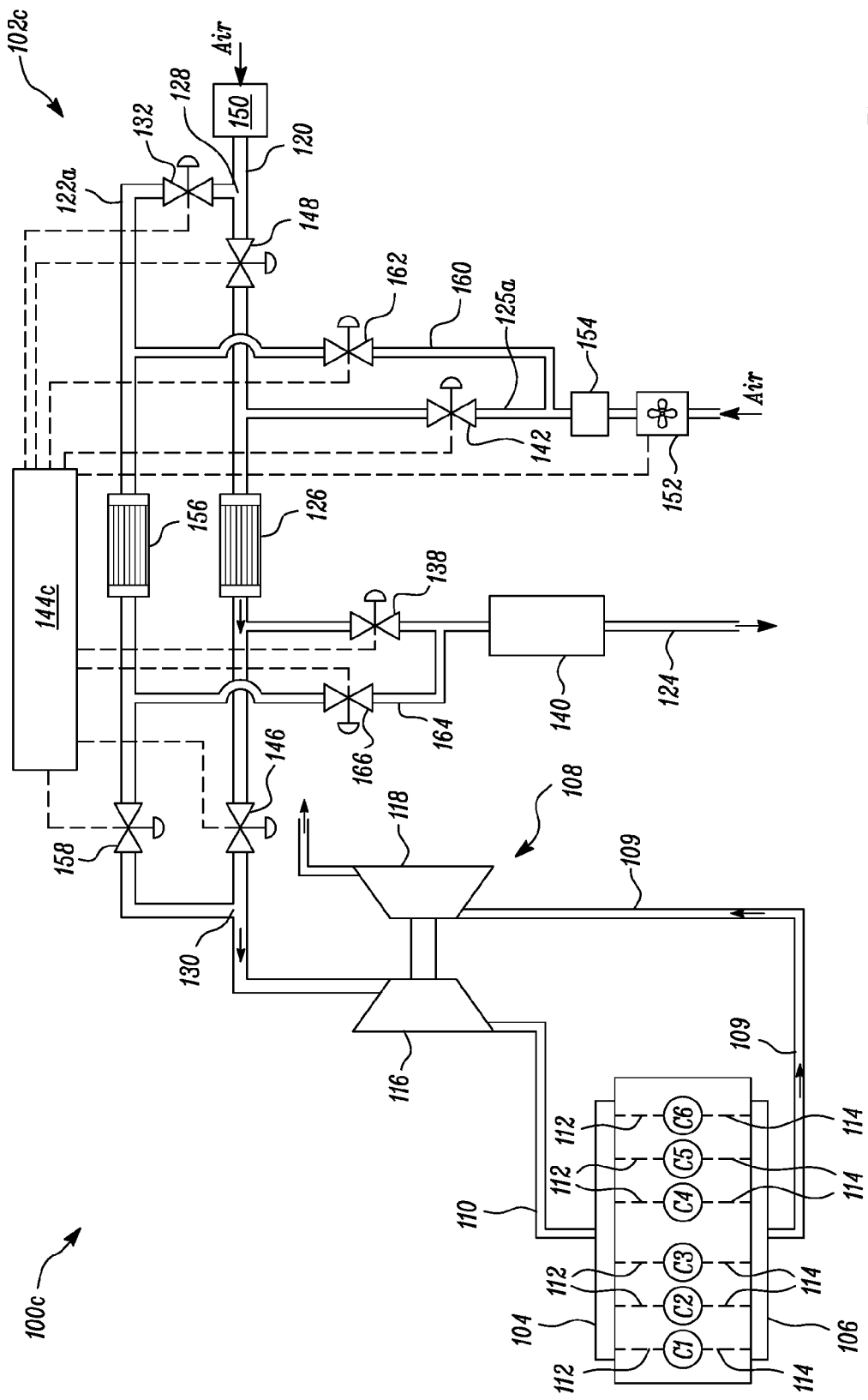
FIG. 4 illustrates an engine including an alternative air intake system in accordance with an embodiment.

Referring to FIG. 4, an engine 100c including an air intake system 102c is shown according to yet another embodiment. The air intake system 102c may include the first air intake conduit 120, the second air intake conduit 122a, the exhaust conduit 124, the second exhaust conduit 164, the regeneration conduit 125a, and the second regeneration conduit 160. In the present embodiment, the second air intake conduit 122a includes the second siloxane adsorber 156. The second siloxane adsorber 156 may remove the siloxane content present in intake air delivered to the combustion cylinders C1 to C6 during the regeneration of the siloxane adsorber 126.

In the illustrated embodiment, the regeneration of the siloxane adsorber 126 and the second siloxane adsorber 156 is performed by heated air. The heated air is delivered to the siloxane adsorber 126 and the second siloxane adsorber 156 by the regeneration conduit 125a and the second regeneration conduit 160 respectively. The fan 152 may be disposed in the regeneration conduit 125a for introducing the air in regeneration conduit 125a and the second regeneration conduit 160 to provide air during regeneration. In an embodiment, the regeneration conduit 125a and the second regeneration conduit 160 may receive air discharged from the compressor 116. The air received from compressor 116 or fan 152 may be suitably heated via the heating module 154 for regenerating the siloxane adsorber 126 and the second siloxane adsorber 156. In an embodiment, the temperature of the air received form the compressor 116 may be such that further heating may not be necessary for performing regeneration of the siloxane adsorber 126 and the second siloxane adsorber 156.

The heating module 154 may be disposed in the regeneration conduit 125a in a similar manner as described earlier in reference to FIG. 2 to heat the air. Additionally, in the present embodiment, the heating module 154 is disposed in the regeneration conduit 125a upstream of the connection of the second regeneration conduit 160 with the regeneration conduit 125a. In an embodiment, separate heating modules may be positioned in the first air intake conduit 120 and the second air intake conduit 122a for heating the air during regeneration of the siloxane adsorber 126 and the second siloxane adsorber 156. In another embodiment, the siloxane adsorber 126 and the second siloxane adsorber 156 may be electrically heated.

A controller 144c may initiate and control the regeneration of the siloxane adsorber 126 and the second siloxane adsorber 156. The controller 144c may initiate and control the regeneration of the siloxane adsorber 126 and the second siloxane adsorber 156 in a similar manner as described earlier in reference to FIG. 3. As describes earlier in reference to FIG. 3, the controller 144c may be in communication with and control opening and closing of the second entry valve 132, the valve 138, the regeneration valve 142, the first entry valve 148, the first exit valve 146, the second exit valve 158, the second regeneration valve 162, and the second valve 166 for performing regeneration of the siloxane adsorber 126 and the second siloxane adsorber 156 and allowing the passage of air to the combustion cylinders C1 to C6 via first air intake conduit 120 and the second air intake conduit 122a.

Figure 5:
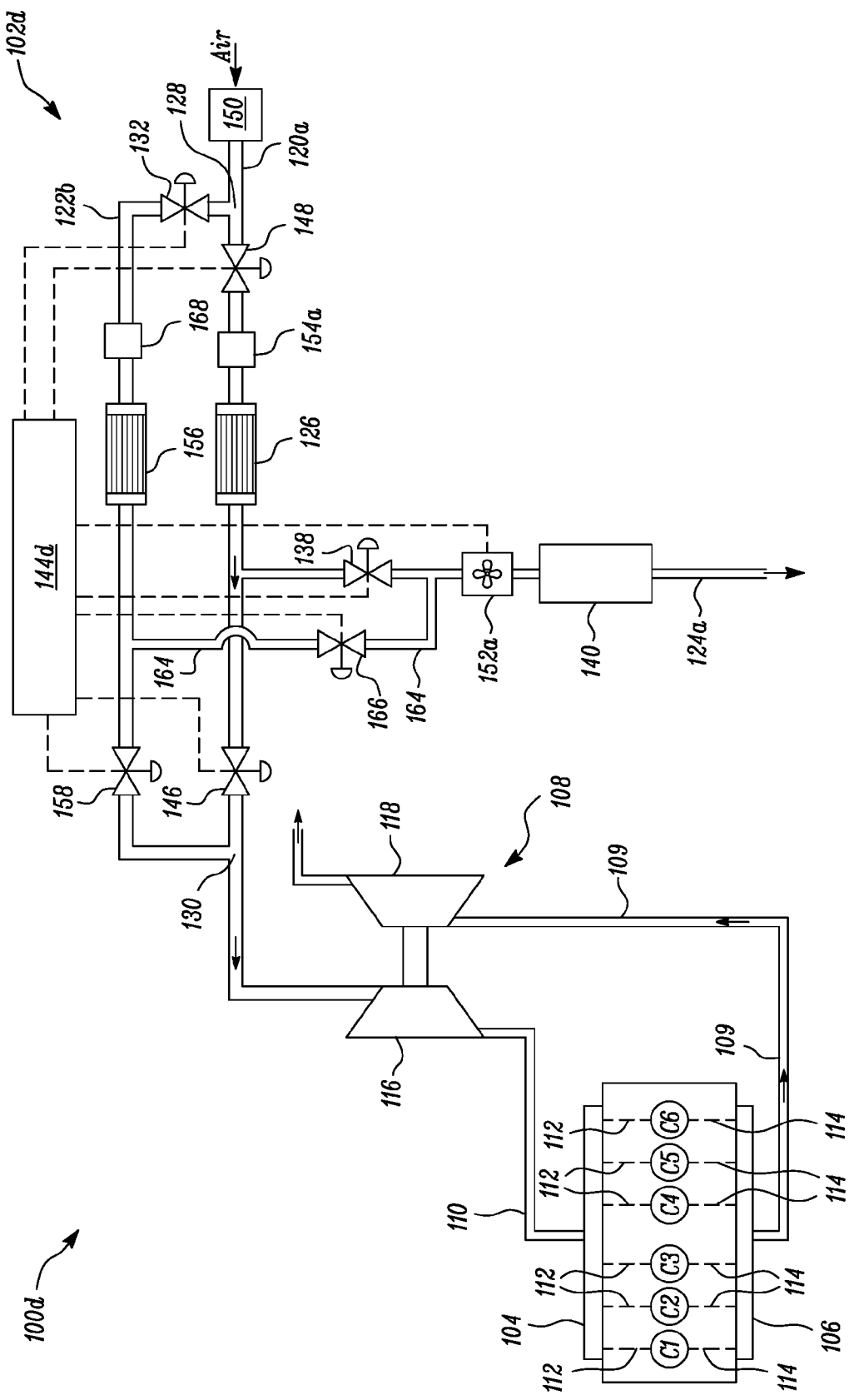
FIG. 5 illustrates an engine including an alternative air intake system in accordance with an embodiment.

Referring to FIG. 5, an engine 100d including an air intake system 102d is shown according to another embodiment. The air intake system 102d may include a first air intake conduit 120a, a second air intake conduit 122b, an exhaust conduit 124a, and the second exhaust conduit 164. The first air intake conduit 120a may include the first entry valve 148, the siloxane adsorber 126, the first exit valve 146, and a heating module 154a.

The heating module 154a may be positioned in the first air intake conduit 120a downstream of the first entry valve 148 and upstream of the siloxane adsorber 126. The heating module 154a may selectively heat the air flowing through the first air intake conduit 120a. The heating module 154a may heat the air for performing regeneration of the siloxane adsorber 126. The heating module 154a may be an electric heater. Although use of electric heater as the heating module 154a is contemplated, any other type of heating module such as a gas heater or any other heater known in the art would also apply. In an embodiment, the heating module 154a may include a fuel injector to inject fuel which is burned in the presence of air to suitably increase the temperature of air flowing through the siloxane adsorber 126 during regeneration of the siloxane adsorber 126.

Further, the second air intake conduit 122b may include the second entry valve 132, the second siloxane adsorber 156, the second exit valve 158, and a second heating module 168. The second heating module 168 may be positioned in the second air intake conduit 122b between the second entry valve 132 and the second siloxane adsorber 156. The second heating module 168 may selectively heat the air flowing through the second air intake conduit 122b for performing regeneration of the second siloxane adsorber 156. The second heating module 168 may be an electric heater. Although use of electric heater as the second heating module 168 is contemplated, any other type of heating module such as a gas heater or any other heater known in the art would also apply. In an embodiment, the second heating module 168 may include a fuel injector to inject fuel which is burned in the presence of air to suitably increase the temperature of air flowing through the second siloxane adsorber 156 during regeneration of the second siloxane adsorber 156.

For performing the regeneration of the siloxane adsorber 126 and the second siloxane adsorber 156, air is drawn from the atmosphere. As shown in FIG. 5, to provide the air for performing regeneration of the siloxane adsorber 126 or the second siloxane adsorber 156, a fan 152a may be disposed in the exhaust conduit 124a. The fan 152a may be positioned upstream of the condenser 140 and downstream of connection of the second exhaust conduit 164 to the exhaust conduit 124a. The fan 152a is operated to draw-in air from the atmosphere through the first air intake conduit 120a via the air filter 150.

Again referring to FIG. 5, in the present embodiment, during regeneration of any of the siloxane adsorber 126 and 156, both the second entry valve 132 and the first entry valve 148 are kept open. In an embodiment, the second entry valve 132 and the first entry valve 148 may be check valve which prevents backflow of the air or gas to the air filter 150. A controller 144d may initiate regeneration of the siloxane adsorber 126 and the second siloxane adsorber 156 as described earlier in reference to FIG. 1 and FIG. 3. Further, the controller 144d may control opening and closing of various valves, start and stop of the fan 152a, and the operation of the heating modules 154a and 168 for performing regeneration of siloxane adsorbers 126 and 156 and delivering filtered intake air to the combustion cylinders C1 to C6.

For regeneration of the siloxane adsorber 126, the first exit valve 146 may be closed and the valve 138 is opened. In order for the intake air to be delivered to the combustion cylinders C1 to C6 through the second air intake conduit 122b, the second exit valve 158 is opened and second valve 166 is closed. Opening of the second exit valve 158 may fluidly couple the compressor 116 with the second air intake conduit 122b, thereby majority of incoming air from the air filter 150 flows through the second air intake conduit 122b. The opening and closing of various valves, the start and stop of the fan 152a, and the operation of the heating modules 154a and 168 may be controlled by a controller 144d.

Further, during regeneration of the siloxane adsorber 126, as the controller 144d starts the fan 152a, some of the air also passes through the first air intake conduit 120a. Also, the controller 144d may control the heating module 154a to heat the air flowing through the first air intake conduit 120a for performing regeneration of the siloxane adsorber 126.

Similarly, the controller 144d may close the second exit valve 158, and open the second valve 166 for performing regeneration of the second siloxane adsorber 156. Also, during regeneration of the second siloxane adsorber 156, the controller 144d may open the first exit valve 146 and close the valve 138. Opening of the first exit valve 146 may fluidly couple the compressor 116 with the first air intake conduit 120a, thereby the majority of incoming air from the air filter 150 flows through the first air intake conduit 120a. Also, the opening of the second valve 166 may fluidly couple the fan 152a with the second air intake conduit 122b, thereby some of the air also passes through the second siloxane adsorber 156. Further, the controller 144d may control the second heating module 168 to heat the air flowing through the second air intake conduit 122b for performing regeneration of the second siloxane adsorber 156.

In an alternate embodiment of FIG. 5, first and second entry valves 148, 132 may be omitted and intake air may be allowed to flow to both the siloxane adsorber 126 and the second siloxane adsorber 156.

INDUSTRIAL APPLICABILITY

The present disclosure provides engine 100, 100a, 100b, 100c and 100d having the air intake system 102, 102a, 102b, 102c, and 102d respectively. The air intake system 102, 102a, 102b, 102c, and 102d provides intake air with zero to minimum siloxane content to the combustion cylinders C1 to C6. The air intake system 102, and 102a includes the siloxane adsorber 126 for removing the siloxane present in intake air. Further, the air intake system 102b, 102c, and 102d includes siloxane adsorbers 126 and 156 for removing the siloxane present in intake air to be delivered to combustion cylinders C1 to C6. The present disclosure also describes regeneration of siloxane adsorbers 126 and 156 during engine operation.

During operation of the engine 100, 100a, 100b, 100c, and 100d, intake air is provided to the combustion cylinders C1 to C6 by the air intake system 102, 102a, 102b, 102c, and 102d. For normal operation of the engine 100, 100a, 100b, 100c, and 100d, the intake air flows through the first air intake conduit 120, 120a. As the intake air is flowing through the first air intake conduit 120, 120a, the siloxane adsorber 126 adsorb the siloxane content present in the intake air. Thereby, the intake air flowing downstream of the air intake system 102, 102a, 102b, 102c, and 102 have minimum to zero siloxanes.

After extended operation of the engine 100, 100a, 100b, 100c, and 100d the storage capacity of the siloxane adsorber 126 may be reached and the siloxane adsorber 126 may not adsorb more siloxane and thereby not remove siloxane present in the intake air effectively. Therefore, the controller 144, 144a, 144b, 144c, and 144d may initiate the regeneration of the siloxane adsorber 126 to remove the siloxanes present in the siloxane adsorber 126. In an embodiment, the controller 144, 144a, 144b, 144c, and 144d may initiate the regeneration of the siloxane adsorber 126 after certain duration of operation of the engine 100, 100a, 100b, 100c, and 100d. The controller 144, 144a, 144b, 144c, and 144d may determine the duration of operation of the engine 100, 100a, 100b, 100c, and 100d based on the amount of siloxanes measured in the ambient air and the siloxane adsorbing capacity of the siloxane adsorber 126. In an embodiment, the controller 144, 144a, 144b, 144c, and 144d may initiate the regeneration of the siloxane adsorber 126 when the amount of siloxane in the intake air measured downstream of the siloxane adsorber 126 is above a threshold value.

For performing regeneration of the siloxane adsorber 126, heated air or exhaust gas is used. As shown in FIG. 1 and FIG. 3, the regeneration of the siloxane adsorber 126 is performed by exhaust gases discharged from the combustion cylinders C1 to C6. As shown in FIG. 2, FIG. 4, and FIG. 5, the regeneration of the siloxane adsorber 126 is performed by using an air heated by the heating module 154 and 154a. For performing the regeneration of the siloxane adsorber 126, the air is provided to siloxane adsorber 126 by operating the fan 152 and 152a. In an embodiment, for performing regeneration of the siloxane adsorber 126, compressed air is delivered from the outlet of the compressor 116. In an alternate embodiment, a portion of the compressed air is bypassed from the supply conduit 110 to perform the regeneration of the siloxane adsorber 126 and/or the siloxane adsorber 156. To provide the compressed air for performing regeneration, the regeneration conduit 125a may be connected to the supply conduit 110 downstream of the compressor 116. In an embodiment, when the compressed air from the compressor 116 is utilized for performing regeneration, the heating module 154 may be omitted.

During regeneration of the siloxane adsorber 126, the gas exiting the siloxane adsorber 126 may be prevented to flow to compressor 116 and further downstream to the combustion cylinders C1 to C6 by closing the first exit valve 146. Also, the controller 144, 144a, 144b, 144c, and 144d opens the valve 138 to discharge the gas exiting the siloxane adsorber 126 when regeneration is being performed. During regeneration, the gas exiting the siloxane adsorber 126 is discharged to atmosphere, stored by a condenser, or converted to silica with a burner via the exhaust conduit 124a by opening the valve 138. The controller 144, 144a, 144b, 144c, and 144d may control various valves of the air intake system 102, 102a, 102b, 102c, and 102d to control the flow of air or gas through the first air intake conduit 120 and 120a, the second air intake conduit 122, 122a, and 122b, and the exhaust conduit 124, 124a during normal operation and during regeneration of the siloxane adsorber 126.

For the duration of the regeneration of the siloxane adsorber 126, the intake air to the compressor 116 and the combustion cylinders are delivered via the second air intake conduit 122, 122a, 122b. As shown in FIG. 3, FIG. 4, and FIG. 5, the second air intake conduit 122a and 122b include the second siloxane adsorber 156. The second siloxane adsorber 156 adsorbs the siloxane present in the intake air delivered to the compressor 116 and further downstream to the combustion cylinders C1 to C6. Thereby, intake air delivered to the combustion cylinders C1 to C6 may have minimum to zero siloxanes present.

Further, regeneration of the second siloxane adsorber 156 may be initiated and performed by the controller 144b, 144c, and 144d. The controller 144b, 144c, and 144d may initiate and perform the regeneration of the second siloxane adsorber 156 similarly to that of the siloxane adsorber 126. The controller 144b, 144c, and 144d may control various valves for controlling the flow of the intake air or gas through the first air intake conduit 120 and 120a, the second air intake conduit 122a and 122b, and the second exhaust conduit 164 during regeneration of the second siloxane adsorber 156. During regeneration of the second siloxane adsorber 156, the intake air is delivered to the combustion cylinders via the first air intake conduit 120 and 120a by opening the first entry valve 148 and the first exit valve 146. Further, the gas exiting the second siloxane adsorber 156 is prevented to flow to the combustion cylinders C1 to C6 by closing the second exit valve 158. During regeneration, the gas exiting the second siloxane adsorber 156 is discharged to atmosphere, stored by a condenser, or converted to silica with a burner via the second exhaust conduit 164 by opening the second valve 166.

Therefore, the air intake system 102, 102a, 102b, 102c, and 102d provides intake air with zero to minimum siloxane content to the combustion cylinders C1 to C6. This helps in preventing the accumulation of silica compounds on various components of the engine, aftertreatment, and exhaust system of the engine 100, 100a, 100b, 100c, and 100d. The lesser accumulation of silica compounds reduces overall maintenance of the components and also increases the life of components. Further, the siloxane adsorber 126 and the second siloxane adsorber 156 may be regenerated during engine operation, reducing the down-time of the engine 100, 100a, 100b, 100c, and 100d. Also, regeneration of the siloxane adsorber 126 and the second siloxane adsorber 156 helps to increase the operational hours of the siloxane adsorbers.

What is claimed is:

1. An air intake system for an engine comprising:
    a first air intake conduit having a siloxane adsorber for providing air to the engine;
    a second air intake conduit for providing air to the engine during regeneration of the siloxane adsorber; wherein the siloxane adsorber is heated during regeneration;
    an exhaust conduit selectively coupled to the first air intake conduit downstream of the siloxane adsorber; and
    a valve configured to couple the first air intake conduit to the exhaust conduit during regeneration of the siloxane adsorber.

2. The air intake system of claim 1, wherein the second air intake conduit includes a second siloxane adsorber.

3. The air intake system of claim 1, wherein an inlet of the second air intake conduit is selectively coupled to the first air intake conduit upstream of the siloxane adsorber and an outlet of the second air intake conduit is selectively coupled to the first air intake conduit downstream of the siloxane adsorber.

4. The air intake system of claim 1, wherein the exhaust conduit includes a condenser for condensing siloxane desorbed for the siloxane adsorber during regeneration.

5. The air intake system of claim 1, wherein the exhaust conduit includes a burner to convert siloxane into silicone dioxide.

6. The air intake system of claim 1, wherein the siloxane adsorber is heated using pre-turbo exhaust for regeneration.

7. The air intake system of claim 1, wherein the siloxane adsorber is heated using compressed air from an outlet of a compressor for regeneration.

8. The air intake system of claim 1, wherein the siloxane adsorber is heated by using a heater to heat the air for regeneration.

9. The air intake system of claim 1, wherein the regeneration of the siloxane adsorber is initiated by a controller based on the amount of siloxanes measured downstream of the siloxane adsorber.

10. The air intake system of claim 1, wherein the regeneration of the siloxane adsorber is initiated by a controller based on the amount of siloxanes measured in ambient air, siloxane adsorbing capacity of the siloxane adsorber, and duration of operation of the engine.

11. An engine comprising:
at least one combustion cylinder;
a first air intake conduit having a siloxane adsorber for providing air to the combustion cylinder;
a second air intake conduit for providing air to the combustion cylinder during regeneration of the siloxane adsorber; wherein the siloxane adsorber is heated during regeneration;
an exhaust conduit selectively coupled to the first air intake conduit downstream of the siloxane adsorber; and
a valve configured to couple the first air intake conduit to the exhaust conduit during regeneration of the siloxane adsorber.

12. The engine of claim 11, wherein the second air intake conduit includes a second siloxane adsorber.

13. The engine of claim 11, wherein an inlet of the second air intake conduit is selectively coupled to the first air intake conduit upstream of the siloxane adsorber and an outlet of the second air intake conduit is selectively coupled to the first air intake conduit downstream of the siloxane adsorber.

14. The engine of claim 11, wherein the exhaust conduit includes a condenser for condensing siloxanes desorbed for the siloxane adsorber during regeneration.

15. The engine of claim 11, wherein the exhaust conduit includes a burner to convert the siloxanes into silicone dioxide.

16. The engine of claim 11, wherein the siloxane adsorber is heated using pre-turbo exhaust for regeneration.

17. The engine of claim 11, wherein the siloxane adsorber is heated by a heater for regeneration.

18. The engine of claim 11, wherein the siloxane adsorber is heated by using heated air for regeneration.

19. The engine of claim 11, wherein the regeneration of the siloxane adsorber is initiated by a controller based on the amount of siloxanes measured downstream of the siloxane adsorber.

20. The air intake system of claim 11, wherein the regeneration of the siloxane adsorber is initiated by a controller based on the amount of siloxanes measured in ambient air, siloxane adsorbing capacity of the siloxane adsorber, and duration of operation of the engine.

* * * * *